May 23, 1972   B. P. G. IRONS   3,664,693
COUPLINGS FOR CONNECTING TWO COMPONENTS
Filed Jan. 14, 1970
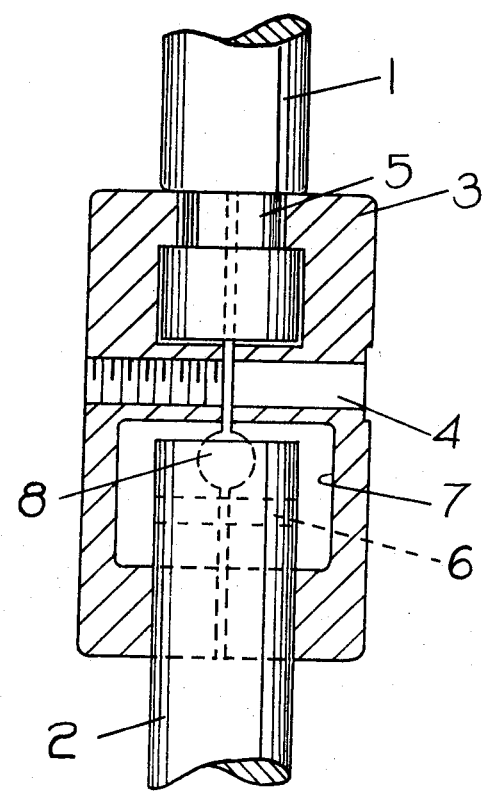
INVENTOR
Brian Pemberton Gyles Irons
Holman, Glascock, Downing & Seebold
ATTORNEYS

3,664,693
COUPLINGS FOR CONNECTING TWO COMPONENTS

Brian Pemberton Gyles Irons, Birmingham, England, assignor to Joseph Lucas (Industries) Limited, Birmingham, England
Filed Jan. 14, 1970, Ser. No. 2,904
Claims priority, application Great Britain, Jan. 24, 1969, 4,047/69
Int. Cl. F16d 1/00
U.S. Cl. 287—111                    2 Claims

ABSTRACT OF THE DISCLOSURE

A couping for connecting two components comprising a sleeve connected to one of the components and defining a cavity for the end of the other component, the cavity having a pouring hole through which molten material can be poured to fill the cavity and also a keying opening in said end of the component.

---

This invention relates to couplings for connecting two components and has particular, though not exclusive utility in relation to components made from brittle materials such as silicon nitride, which cannot be clamped without severe risk of fracture.

The object of the invention is to provide a coupling in a convenient form.

According to the present invention a coupling for connecting two components comprises a sleeve connected to one of the components and arranged to surround the end of the other component, the sleeve defining a cavity within which said end of the other component is disposed, a pouring hole in the sleeve communicating with said cavity, said end of said other component having a keying means therein, and the cavity said said keying means being filled with a material which is poured in molten state through said pouring hole and solidifies on cooling.

In accordance with a further aspect of the invention, a method of assembling a coupling for connecting two components comprises making a sleeve, connecting the sleeve to one of the components, engaging the sleeve over the end of the other component, said other component having a keying means in its end, the sleeve defining a cavity within which the end of said other component is disposed, and the sleeve having a pouring hole communicating with the interior of said cavity, pouring a material in molten state into the cavity and keying means through said pouring hole, and cooling said material to cause it to solidify.

The invention will now be described by way of example with reference to the accompanying drawing, the single figure of which represents a pair of components connected in accordance with the invention.

The drawing shows two co-axial rod like components 1 and 2, which, for example, form part of a connecting rod for a pump, or other apparatus in which there is substantially no tendency for relative rotation between the components.

In this example the component 2 is formed from a hard and brittle material such as silicon nitride.

The components are connected together by means of a sleeve 3 which is formed in two symmetrical halves. Extending diametrically through the sleeve is a hole 4 which is screw-threaded in one of the halves of the sleeve, and unthreaded in the other. This hole 4 receives a bolt whereby the two halves of the sleeve can be clamped together.

The component 1 is secured in one end of the sleeve by this clamping action, and has an annular recess 5 engaging an inward annular flange at the end of the sleeve 3.

The component 2, however, is cylindrical over its portion which enters the other end of the sleeve 3, but has a diametrical drilling 6 forming a keying opening in the end of this component 2.

The end of the sleeve 3, in which the end of the component 2 is engaged, has an inward annular flange which, in the clamped condition of the sleeve, is approximately the same diameter as the end of the component 2, though it is not intended that clamping by means of the bolt in the hole 4 should exert any substantial force on the external surface of the component 2.

The sleeve 3 defines a cavity 7 surrounding the end of the component 2, the drilling 6 having its ends within this cavity 7.

In the side of the sleeve 3 is a pouring hole 8.

In order to assemble the sleeve 3 and components 1 and 2, the sleeve halves are clamped around the end of the component 1 by means of the bolt passing through the hole 4. The component 2 is now inserted through the other end of the sleeve 3 so that the drilling 6 is within the cavity 7.

Molten material is now poured into the cavity 7 through the pouring hole 8, and completely fills the cavity 7 and drilling 6. This material is now allowed to cool and solidify thus firmly securing the component 2 in the sleeve 3.

In this example, the material which is poured into the cavity 7 and drilling 6 is aluminium which has a melting point substantially below that of the sleeve and component 2.

It is necessary that the drilling 6 shall be formed in the component 2 before final heat treatment is applied to it to harden it.

If both components 1 and 2 are formed from a brittle material the method of securing the component 2 in the sleeve 3 is also applied to the other component.

The sleeve can, however, be connected to, or formed on, a component of any desired form to which a brittle component, such as 2, is to be connected.

The halves of the sleeve 3 can be secured together in any convenient manner, for example the bolt described could be replaced by a contractible screwed clip fastener.

Having thus described my invention what I claim as new and desire to secure by Letters Patent is:

1. A coupling for connecting, at one end, two rod components comprising a sleeve connected to one end of one of the components and arranged to surround a cylindrical end of the other component, the sleeve defining an enclosed cavity separated from said one end of the first component by a transverse wall portion, said end of the other component being disposed in said cavity, a pouring hole in the sleeve intersecting the interior of said cavity, said end of said other component having a transverse bore forming keying means therein, and the cavity and said keying means being filled with a material which is poured in molten state through said pouring hole and solidifies on cooling.

2. A method of assembling a coupling for connecting, at one end, two rod components comprising making a sleeve, connecting the sleeve to one end of one of the components, engaging the sleeve over a cylindrical end of the other component, said other component having a transverse bore forming a keying means in its end, the sleeve defining an enclosed cavity separated from the end of the first component by a wall portion, the end of the other component being disposed in said cavity, and the sleeve having a pouring hole intersecting the interior of said cavity, pouring a molten material in molten state into the cavity and keying means through said pouring hole, and cooling said material to cause it to solidify.

References Cited

UNITED STATES PATENTS

| 303,132 | 8/1884 | Eaton | 285—297 X |
| 334,286 | 1/1886 | Reed | 285—373 |
| 339,036 | 3/1886 | Wilbur | 285—294 |
| 397,221 | 2/1889 | Callender | 285—419 |
| 1,073,776 | 9/1913 | Neville | 287—111 |
| 1,344,221 | 6/1920 | Burns | 285—297 |
| 2,156,604 | 5/1939 | Payne et al. | 285—373 X |
| 3,491,182 | 1/1970 | Hunder et al. | 287—111 UX |

FOREIGN PATENTS

| 688,923 | 3/1953 | Great Britain | 285—294 |

ANDREW V. KUNDRAT, Primary Examiner

U.S. Cl. X.R.

285—294; 29—530